United States Patent
Wang

(10) Patent No.: US 8,997,417 B2
(45) Date of Patent: Apr. 7, 2015

(54) DOOR MADE OF POLYURETHANE AND METHOD FOR MANUFACTURING THE SAME

(71) Applicant: Zhongping Wang, Ningbo (CN)

(72) Inventor: Zhongping Wang, Ningbo (CN)

( * ) Notice: Subject to any disclaimer, the term of this patent is extended or adjusted under 35 U.S.C. 154(b) by 159 days.

(21) Appl. No.: 13/753,499

(22) Filed: Jan. 29, 2013

(65) Prior Publication Data
US 2014/0024732 A1    Jan. 23, 2014

(30) Foreign Application Priority Data
Jul. 19, 2012    (CN) .......................... 2012 1 0250414

(51) Int. Cl.
| | | |
|---|---|---|
| E04C 1/00 | (2006.01) | |
| C08K 5/3492 | (2006.01) | |
| C08K 3/02 | (2006.01) | |
| C08K 3/32 | (2006.01) | |
| B29C 33/58 | (2006.01) | |
| C08G 18/66 | (2006.01) | |
| C08G 18/76 | (2006.01) | |
| C08G 18/18 | (2006.01) | |
| C08G 18/20 | (2006.01) | |
| C08K 5/54 | (2006.01) | |
| C08G 101/00 | (2006.01) | |

(52) U.S. Cl.
CPC ............... *C08K 5/34922* (2013.01); *C08K 3/02* (2013.01); *C08K 3/32* (2013.01); *B29C 33/58* (2013.01); *C08G 18/6677* (2013.01); *C08G 18/7664* (2013.01); *C08G 18/1808* (2013.01); *C08G 18/2063* (2013.01); *C08K 5/5406* (2013.01); *C08G 2101/0025* (2013.01); *C08G 2101/0083* (2013.01)

(58) Field of Classification Search
CPC ................... C08G 2101/00; C08G 2101/0083; C08G 2101/0025; C08G 18/4816; C08G 18/3228; C08G 18/6685; C08G 18/667
USPC .......... 52/309.4, 309.8, 309.9; 264/45.3, 45.6; 521/174, 176
See application file for complete search history.

(56) References Cited

U.S. PATENT DOCUMENTS

| | | | | |
|---|---|---|---|---|
| 5,142,835 A | * | 9/1992 | Mrocca ...................... | 52/309.12 |
| RE36,240 E | * | 6/1999 | Minke et al. ................. | 52/313 |
| 2010/0101165 A1 | * | 4/2010 | Buffy et al. .................. | 52/309.4 |

FOREIGN PATENT DOCUMENTS

| | | | | |
|---|---|---|---|---|
| EP | 940416 | * | 9/1999 | ............. C08G 18/42 |

* cited by examiner

*Primary Examiner* — Michael L Leonard

(57) ABSTRACT

A door made of polyurethane, including a door body, the door body including a plurality of integrated plates stacked on one another for supporting. A method for preparing the door includes providing a mold, and spraying a parting agent inside the mold; heating the mold to a temperature of 30-70° C., spraying the parting agent, and placing a plurality of plates or a metal skeleton in the mold; mixing raw materials to obtain a mixture; injecting the mixture into the mold to cover the stacked plates, and curing for 30-90 min; demolding, transferring a product from the mold to a thermostatic chamber for shaping at a constant temperature; trimming uneven edges and surfaces of the product; and spraying a paint on the product.

5 Claims, 4 Drawing Sheets

DOOR MADE OF POLYURETHANE AND METHOD FOR MANUFACTURING THE SAME

CROSS-REFERENCE TO RELATED APPLICATIONS

Pursuant to 35 U.S.C. §119 and the Paris Convention Treaty, this application claims the benefit of Chinese Patent Application No. 201210250414.0 filed Jul. 19, 2012, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a polyurethane product, and more particularly to a door made of polyurethane and a method for preparing the same.

2. Description of the Related Art

Polyurethane foam has been applied in inner doors' production; whereas, most of polyurethane foams are used as filling materials in composite doors.

A typical door made of polyurethane includes a matrix. The matrix is obtained by pressing a polyurethane material to a door shape; a wood texture is disposed on the matrix surface and integrated with the matrix. Furthermore, a coating is spread over the matrix surface for protection. Because the above technical scheme is adopted, the wood texture is stamped on the matrix surface when the polyurethane material is pressed to a door shape, thus the surface of the polyurethane door seems like natural wood due to the wood texture on the surface. Thereafter, the matrix surface is coated with a protecting coating, thereby preventing the wood texture from fading away.

However, the polyurethane door is apt to warp and fissure; moreover, it has a low size consistency.

SUMMARY OF THE INVENTION

In view of the above-described problems, it is one objective of the invention to provide a door made of polyurethane which has waterproof properties, low swell factor, good consistency in production sizes, and no warpage or fissure after long term use.

To achieve the above objective, in accordance with one embodiment of the invention, there is provided a door made of polyurethane, comprising a door body; the door body comprises a plurality of integrated plates stacked on one another for supporting.

In a class of this embodiment, the door body is made from the following raw materials by weight:

| | |
|---|---|
| a polyether polyol having a molecular weight of 300-350 and a functionality of 4-6 | 5-15; |
| a polyether polyol having a molecular weight of 600-700 and a functionality of 4-6 | 30-50; |
| a polyether polyol having a molecular weight of 800-900 and a functionality of 4-6 | 20-40; |
| a catalyst of 1,8-Diazabicyclo[5.4.0]undec-7-ene (DBU) | 0.05-0.15; |
| pentamethyl diethylenetriamine | 0.05-0.15; |
| tetramethylethylenediamine | 0.5-1.5; |
| a triphosphate as a flame retardant | 5-15; |
| melamine | 5-10; |
| a microencapsulated red phosphorus as a flame retardant | 5-10; |
| silicone oil | 1-2; |
| water | 0-0.5; and |
| a polyphenyl methane polyisocyanate | 110-130. |

In a class of this embodiment, the door body is made from the following raw materials by weight:

| | |
|---|---|
| the polyether polyol having the molecular weight of 300-350 and the functionality of 4-6 | 8-12; |
| the polyether polyol having the molecular weight of 600-700 and the functionality of 4-6 | 33-45; |
| the polyether polyol having the molecular weight of 800-900 and the functionality of 4-6 | 25-35; |
| the catalyst of DBU | 0.05-0.15; |
| pentamethyl diethylenetriamine | 0.1-0.12; |
| tetramethylethylenediamine | 0.1-1.2; |
| the triphosphate | 8-12; |
| melamine | 8-9; |
| the microencapsulated red phosphorus flame retardant | 6-8; |
| the silicone oil | 1.5-1.8; |
| water | 0.2-0.4; and |
| the polyphenyl methane polyisocyanate | 115-125. |

In a class of this embodiment, the door body is made from the following raw materials by weight:

| | |
|---|---|
| the polyether polyol having the molecular weight of 300-350 and the functionality of 4-6 | 10; |
| the polyether polyol having the molecular weight of 600-700 and the functionality of 4-6 | 40; |
| the polyether polyol having the molecular weight of 800-900 and the functionality of 4-6 | 30; |
| the catalyst of DBU | 0.1; |
| pentamethyl diethylenetriamine | 0.11; |
| tetramethylethylenediamine | 0.11; |
| the triphosphate | 10; |
| melamine | 8.5; |
| the microencapsulated red phosphorus flame retardant | 7; |
| the silicone oil | 1.6; |
| water | 0.3; and |
| the polyphenyl methane polyisocyanate | 120. |

It is another objective of the invention to provide a method for preparing the polyurethane door, the method comprising the following steps:

1) providing a mold, and spraying a parting agent inside the mold;
2) heating the mold to a temperature of 30-70° C., spraying the parting agent, and placing a plurality of plates or a metal skeleton in the mold;
3) completely mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water to obtain a component A; and employing the polyphenyl methane polyisocyanate as a component B;
4) mixing the components A and B using a polyurethane doser to obtain a mixture, injecting the mixture into the mold, polymerizing and foaming the mixture to cover the stacked plates, and curing for 30-90 min;
5) demolding, transferring a product from the mold to a thermostatic chamber for shaping at a constant temperature;

6) trimming uneven edges and surfaces of the product; and
7) spraying a paint on the product.

It is still another objective of the invention to providing a method for preparing the polyurethane door, the method comprising steps as follows:

1) providing a mold, and laying a wood texture film inside the mold;
2) heating the mold to a temperature of 30-70° C., and placing a plurality of plates or a metal skeleton in the mold;
3) completely mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water to obtain a component A; and employing the polyphenyl methane polyisocyanate as a component B;
4) mixing the components A and B using a polyurethane doser to obtain a mixture, injecting the mixture into the mold, polymerizing and foaming the mixture to cover the stacked plates, and curing for 30-90 min;
5) demolding, transferring a product from the mold to a thermostatic chamber for shaping at a constant temperature;
6) trimming uneven edges and surfaces of the product; and
7) spraying a paint on the product.

Advantages of the invention are summarized as follows:
1) the polyurethane door has waterproof properties, low swell factor, good consistency in production sizes, and no warpage or fissure after long term use;
2) the polyurethane door has beautiful appearances, wood textures on surfaces are the same as those of the solid wood doors; polyurethane polymer material is advantageous in its insulation, waterproof, and moisture-proof, thus, a door made from such a polymer material has a good water resisting property; no hygroscopicity, condensation, swell, or corrosion; and
3) the polyurethane door has a strong fire retardancy, and good insulating property; because the polyurethane polymer material has a B1 degree fire retardancy and a low thermal conductivity, thereby lowering the energy consumption of a building; furthermore, the polyurethane door has a simple operation, and can be cut and assembled easily.

BRIEF DESCRIPTION OF THE DRAWINGS

The invention is described hereinbelow with reference to the accompanying drawings, in which.

DETAILED DESCRIPTION OF THE EMBODIMENTS

Detailed description of the invention will be given below in conjunction with accompanying drawings.

Figure 1:
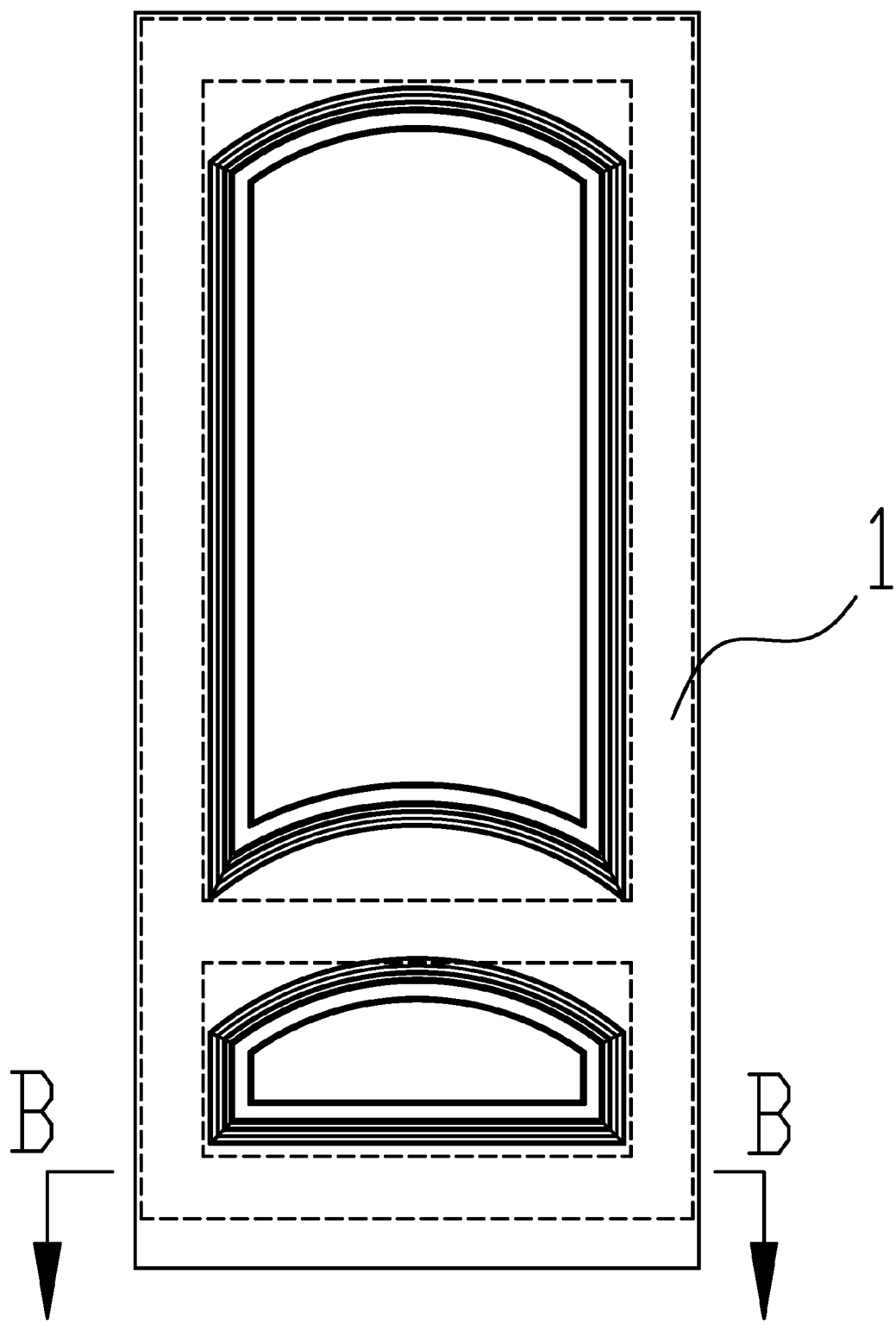
FIG. 1 is a structural diagram of a door made of polyurethane according to one embodiment of the invention.
Figure 2:
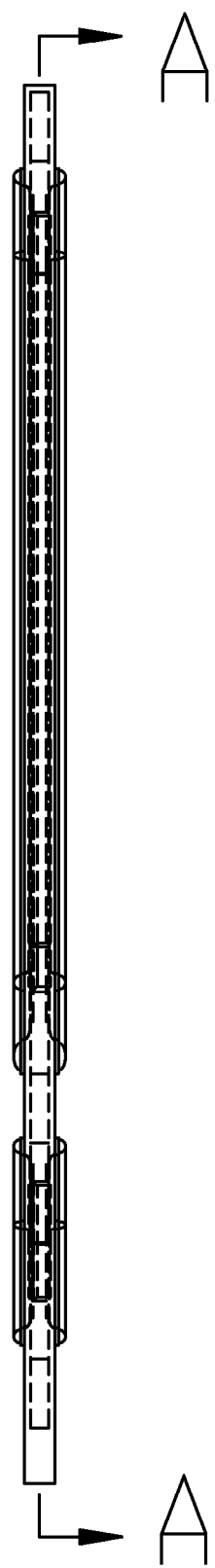
FIG. 2 is a left view of a door made of polyurethane according to one embodiment of the invention.
Figure 3:
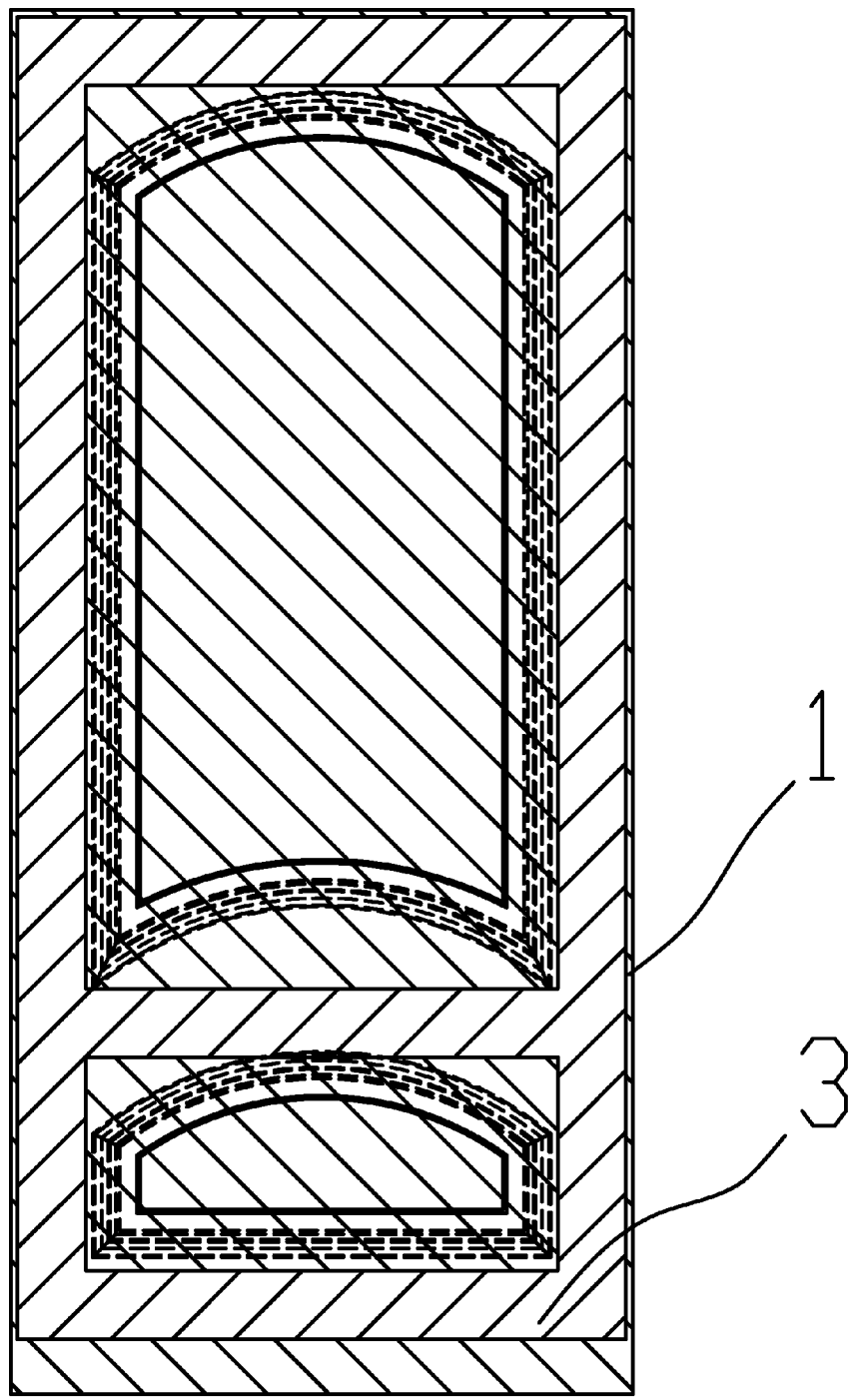
FIG. 3 is a cross-sectional view taken from line A-A of FIG. 2.
Figure 4:
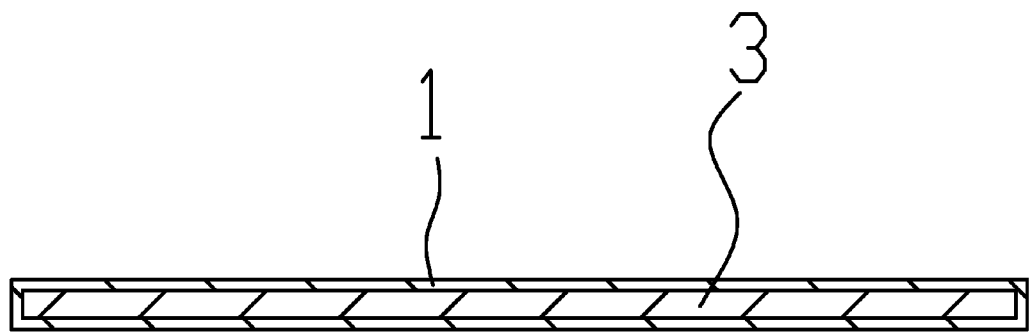
FIG. 4 is a cross-sectional view taken from line B-B of FIG. 4.

As shown in FIGS. 1-4, a door made of polyurethane comprises a door body 1. The door body 1 comprises a plurality of integrated plates 3 stacked on one another for supporting. The stacked plates 3 are shaped like a Chinese character "ri". The plates can be substituted with a metal skeleton. During the processing, a plurality of plates 3 are placed in a mold to form a skeleton, the skeleton is functioned in supporting, thereby largely improving the intensity of the door. In other words, the polyurethane door has a stable size, low swell factor, no warpage or fissure, and has a good consistency in the size of production.

The door body 1 is made from some raw materials according to a certain ratio, which are specifically exemplified hereinbelow.

Example 1

Ingredients of a Component A

| | |
|---|---|
| a polyether polyol having a molecular weight of 300-350 and a functionality of 4-6 | 5 kg; |
| a polyether polyol having a molecular weight of 600-700 and a functionality of 4-6 | 350 kg; |
| a polyether polyol having a molecular weight of 800-900 and a functionality of 4-6 | 20 kg; |
| a catalyst of DBU | 0.05 kg; |
| pentamethyl diethylenetriamine acting as a foaming catalyst | 0.05 kg; |
| tetramethylethylenediamine acting as a balancing catalyst | 0.55 kg; |
| a triphosphate acting as a flame retardant | 5 kg; |
| melamine acting as a flame retardant | 5 kg; |
| microencapsulated red phosphorus as a flame retardant | 5 kg; and |
| silicone oil for stabilizing the foaming | 1 kg. |

The catalyst of DBU is supplied by Air Products and Chemicals, Inc. The microencapsulated red phosphorus is supplied by Shanghai Xusen Non-halogen Smoke Suppressing Fire Retardant Co., LTD. The same ingredients in the following examples are supplied by the same companies, or supplied by other companies.

Ingredient of a Component B

| | |
|---|---|
| a polyphenyl methane polyisocyanate Sup5005 | 110 kg. |

The polyphenyl methane polyisocyanate Sup5005 is supplied by Huntsman International LLC. or by other companies.

Thereafter, the following steps were carried out:
1) spraying a parting agent inside a mold;
2) heating the mold to a temperature of 30-70° C., spraying the parting agent, and placing a plurality of pretreated plates 3 in the mold;
3) completely mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water according to the above ratio to obtain the component A; and employing the polyphenyl methane polyisocyanate as the component B;
4) mixing the components A and B using a polyurethane doser to obtain a mixture, injecting the mixture into the mold, polymerizing and foaming the mixture to cover the stacked plates, and curing for 30-90 min;
5) demolding, and transferring a product from the mold to a thermostatic chamber for shaping at a constant temperature;
6) trimming uneven edges and surfaces of the product; and
7) spraying a paint on the product.

Example 2

Ingredients of a Component A

| | |
|---|---|
| a polyether polyol having a molecular weight of 300-350 and a functionality of 4-6 | 15 kg; |
| a polyether polyol having a molecular weight of 600-700 and a functionality of 4-6 | 50 kg; |
| a polyether polyol having a molecular weight of 800-900 and a functionality of 4-6 | 40 kg; |
| a catalyst of DBU | 0.15 kg; |
| pentamethyl diethylenetriamine acting as a foaming catalyst | 0.15 kg; |
| tetramethylethylenediamine acting as a balancing catalyst | 1.5 kg; |
| a triphosphate acting as a flame retardant | 15 kg; |
| melamine acting as a flame retardant | 10 kg; |
| a microencapsulated red phosphorus flame retardant | 10 kg; |
| silicone oil for stabilizing the foaming | 2 kg; and |
| water | 0.5 kg. |

Ingredient of a Component B

| | |
|---|---|
| a polyphenyl methane polyisocyanate Sup5005 | 130 kg. |

Thereafter, the following steps were carried out:
1) spraying a parting agent inside a mold;
2) heating the mold to a temperature of 30-70° C., spraying the parting agent, and placing a plurality of plates in the mold;
3) completely mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water according to the above ratio to obtain the component A; and employing the polyphenyl methane polyisocyanate Sup5005 as the component B;
4) mixing the components A and B using a polyurethane doser to obtain a mixture, injecting the mixture into the mold, polymerizing and foaming the mixture to cover the stacked plates, and curing for 30-90 min;
5) demolding, and transferring a product from the mold to a thermostatic chamber for shaping at a constant temperature;
6) trimming uneven edges and surfaces of the product; and
7) spraying a paint on the product.

Example 3

Ingredients of a Component A

| | |
|---|---|
| a polyether polyol having a molecular weight of 300-350 and a functionality of 4-6 | 8 kg; |
| a polyether polyol having a molecular weight of 600-700 and a functionality of 4-6 | 33 kg; |
| a polyether polyol having a molecular weight of 800-900 and a functionality of 4-6 | 25 kg; |
| a catalyst of DBU | 0.05 kg; |
| pentamethyl diethylenetriamine acting as a foaming catalyst | 0.1 kg; |
| tetramethylethylenediamine acting as a balancing catalyst | 0.1 kg; |
| a triphosphate acting as a flame retardant | 8 kg; |
| melamine acting as a flame retardant | 8 kg; |
| a microencapsulated red phosphorus flame retardant | 6 kg; |
| silicone oil for stabilizing the foaming | 1.5 kg; and |
| water | 0.2 kg. |

Ingredient of a Component B

| | |
|---|---|
| a polyphenyl methane polyisocyanate Sup5005 | 115 kg. |

Thereafter, the following steps were carried out:
1) spraying a parting agent inside a mold;
2) heating the mold to a temperature of 30-70° C., spraying the parting agent, and placing a plurality of pretreated plates in the mold;
3) completely mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water according to the above ratio to obtain the component A; and employing the polyphenyl methane polyisocyanate as the component B;
4) mixing the components A and B using a polyurethane doser to obtain a mixture, injecting the mixture into the mold, polymerizing and foaming the mixture to cover the stacked plates, and curing for 30-90 min;
5) demolding, and transferring a product from the mold to a thermostatic chamber for shaping at a constant temperature;
6) trimming uneven edges and surfaces of the product; and
7) spraying a paint on the product.

Example 4

Ingredients of a Component A

| | |
|---|---|
| a polyether polyol having a molecular weight of 300-350 and a functionality of 4-6 | 12 kg; |
| a polyether polyol having a molecular weight of 600-700 and a functionality of 4-6 | 45 kg; |

-continued

| | |
|---|---|
| a polyether polyol having a molecular weight of 800-900 and a functionality of 4-6 | 35 kg; |
| a catalyst of DBU | 0.15 kg; |
| pentamethyl diethylenetriamine acting as a foaming catalyst | 0.12 kg; |
| tetramethylethylenediamine acting as a balancing catalyst | 1.2 kg; |
| a triphosphate acting as a flame retardant | 12 kg; |
| melamine acting as a flame retardant | 9 kg; |
| a microencapsulated red phosphorus flame retardant | 8 kg; |
| silicone oil for stabilizing the foaming | 1.8 kg; and |
| water | 0.4 kg. |

Ingredient of a Component B

| | |
|---|---|
| a polyphenyl methane polyisocyanate Sup5005 | 125 kg. |

Thereafter, the following steps were carried out:
1) spraying a parting agent inside a mold;
2) heating the mold to a temperature of 30-70° C., spraying the parting agent, and placing a plurality of pretreated plates in the mold;
3) completely mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water according to the above ratio to obtain the component A; and employing the polyphenyl methane polyisocyanate as the component B;
4) mixing the components A and B using a polyurethane doser to obtain a mixture, injecting the mixture into the mold, polymerizing and foaming the mixture to cover the stacked plates, and curing for 30-90 min;
5) demolding, and transferring a product from the mold to a thermostatic chamber for shaping at a constant temperature;
6) trimming uneven edges and surfaces of the product; and
7) spraying a paint on the product.

Example 5

Ingredients of a Component A

| | |
|---|---|
| a polyether polyol having a molecular weight of 300-350 and a functionality of 4-6 | 10 kg; |
| a polyether polyol having a molecular weight of 600-700 and a functionality of 4-6 | 40 kg; |
| a polyether polyol having a molecular weight of 800-900 and a functionality of 4-6 | 30 kg; |
| a catalyst of DBU | 0.1 kg; |
| pentamethyl diethylenetriamine acting as a foaming catalyst | 0.11 kg; |
| tetramethylethylenediamine acting as a balancing catalyst | 0.11 kg; |
| a triphosphate acting as a flame retardant | 10 kg; |
| melamine acting as a flame retardant | 8.5 kg; |
| a microencapsulated red phosphorus flame retardant | 7 kg; |
| silicone oil for stabilizing the foaming | 1.6 kg; and |
| water | 0.3 kg. |

Ingredient of a Component B

| | |
|---|---|
| a polyphenyl methane polyisocyanate Sup5005 | 120 kg. |

Thereafter, the following steps were carried out:
1) spraying a parting agent inside a mold;
2) heating the mold to a temperature of 30-70° C., spraying the parting agent, and placing a plurality of pretreated plates in the mold;
3) completely mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water according to the above ratio to obtain the component A; and employing the polyphenyl methane polyisocyanate as the component B;
4) mixing the components A and B using a polyurethane doser to obtain a mixture, injecting the mixture into the mold, polymerizing and foaming the mixture to cover the stacked plates, and curing for 30-90 min;
5) demolding, and transferring a product from the mold to a thermostatic chamber for shaping at a constant temperature;
6) trimming uneven edges and surfaces of the product; and
7) spraying a paint on the product.

In actual operation, a wood texture film is adopted for an integrated formation process. Specific steps are as follows:
1) laying a wood texture film inside the mold;
2) heating the mold to a temperature of 30-70° C., spraying the parting agent, and placing a plurality of pretreated plates or a metal skeleton in the mold;
3) completely mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water according to the above ratio to obtain the component A; and employing the polyphenyl methane polyisocyanate as the component B;
4) mixing the components A and B using the polyurethane doser to obtain a mixture, injecting the mixture into the mold, polymerizing and foaming the mixture to cover the stacked plates, and curing for 30-90 min;
5) demolding, and transferring a product from the mold to the thermostatic chamber for shaping at a constant temperature;
6) trimming uneven edges and surfaces of the product; and
7) spraying a paint on the product.

The products have beautiful appearances, wood textures on surfaces are the same as those of the solid wood doors; polyurethane polymer material is advantageous in its insulation, waterproof, and moisture-proof, thus, a door made from such a polymer material has a good water resisting property, and no hygroscopicity, condensation, swell, or corrosion occurs.

The door made has a strong fire retardancy, and good insulating property; because the polyurethane polymer material has a B1 degree fire retardancy and a low thermal conductivity (≤0.024 W/mK) thereby lowering the energy consumption of a building. Furthermore, the polyurethane door has a simple operation, and can be cut and assembled easily.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A door comprising a door body (1) comprising polyurethane; wherein the door body (1) comprises a plurality of integrated plates (3) stacked on one another for support; wherein the door body (1) is made from the following raw materials by weight:

| | |
|---|---|
| a) a polyether polyol having a molecular weight of 300-350 and a functionality of 4-6 | 5-15; |
| b) a polyether polyol having a molecular weight of 600-700 and a functionality of 4-6 | 30-50; |
| c) a polyether polyol having the molecular weight of 800-900 and the functionality of 4-6 | 20-40; |
| d) a catalyst of 1,8-Diazabicyclo[5.4.0]undec-7-ene (DBU) | 0.05-0.15; |
| e) pentamethyl diethylenetriamine | 0.05-0.15; |
| f) tetramethylethylenediamine | 0.5-1.5; |
| g) a triphosphate | 5-15; |
| h) melamine | 5-10; |
| i) a microencapsulated red phosphorus flame retardant | 5-10; |
| j) silicone oil | 1-2; |
| k) water | 0-0.5; and |
| l) a polyphenyl methane polyisocyanate | 110-130. |

2. The door of claim 1, wherein the door body is made from the following raw materials by weight:

| | |
|---|---|
| a) the polyether polyol having the molecular weight of 300-350 and the functionality of 4-6 | 8-12; |
| b) the polyether polyol having the molecular weight of 600-700 and the functionality of 4-6 | 33-45; |
| c) the polyether polyol having the molecular weight of 800-900 and the functionality of 4-6 | 25-35; |
| d) the catalyst of DBU | 0.05-0.15; |
| e) pentamethyl diethylenetriamine | 0.1-0.12; |
| f) tetramethylethylenediamine | 0.1-1.2; |
| g) the triphosphate | 8-12; |
| h) melamine | 8-9; |
| i) the microencapsulated red phosphorus flame retardant | 6-8; |
| j) the silicone oil | 1.5-1.8; |
| k) water | 0.2-0.4; and |
| l) the polyphenyl methane polyisocyanate | 115-125. |

3. The door of claim 1, wherein the door body is made from the following raw materials by weight:

| | |
|---|---|
| a) the polyether polyol having the molecular weight of 300-350 and the functionality of 4-6 | 10; |
| b) the polyether polyol having the molecular weight of 600-700 and the functionality of 4-6 | 40; |
| c) the polyether polyol having the molecular weight of 800-900 and the functionality of 4-6 | 30; |
| d) the catalyst of DBU | 0.1; |
| e) pentamethyl diethylenetriamine | 0.11; |
| f) tetramethylethylenediamine | 0.11; |
| g) the triphosphate | 10; |
| h) melamine | 8.5; |
| i) the microencapsulated red phosphorus flame retardant | 7; |
| j) the silicone oil | 1.6; |
| k) water | 0.3; and |
| l) the polyphenyl methane polyisocyanate | 120. |

4. A method for preparing the door of claim 1, the method comprising the following steps:
1) providing a mold, and spraying a parting agent inside the mold;
2) heating the mold to a temperature of 30-70° C., spraying the parting agent, and placing a plurality of the plates or a metal skeleton in the mold;
3) mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water to obtain a component A; and employing the polyphenyl methane polyisocyanate as a component B;
4) mixing the components A and B using a polyurethane doser to obtain a mixture, injecting the mixture into the mold, polymerizing and foaming the mixture to cover the stacked plates, and curing for 30-90 min;
5) demolding, transferring a product from the mold to a thermostatic chamber for shaping at a constant temperature;
6) trimming uneven edges and surfaces of the product; and
7) spraying a paint on the product.

5. A method for preparing the door of claim 1, the method comprising the following steps:
1) providing a mold, and laying a wood texture film inside the mold;
2) heating the mold to a temperature of 30-70° C., and placing a plurality of the plates or a metal skeleton in the mold;
3) mixing the polyether polyol having the molecular weight of 300-350 and the functionality of 4-6, the polyether polyol having the molecular weight of 600-700 and the functionality of 4-6, the polyether polyol having the molecular weight of 800-900 and the functionality of 4-6, the catalyst of DBU, pentamethyl diethylenetriamine, tetramethylethylenediamine, the triphosphate, melamine, the microencapsulated red phosphorus flame retardant, the silicone oil, and water to obtain a component A; and employing the polyphenyl methane polyisocyanate as a component B;
4) mixing the components A and B using a polyurethane doser to obtain a mixture, injecting the mixture into the mold, polymerizing and foaming the mixture to cover the stacked plates, and curing for 30-90 min;
5) demolding, transferring a product from the mold to a thermostatic chamber for shaping at a constant temperature;
6) trimming uneven edges and surfaces of the product; and
7) spraying a paint on the product.

* * * * *